(12) United States Patent
Li (10) Patent No.: US 12,217,027 B2
(45) Date of Patent: Feb. 4, 2025

(54) VISUAL PROGRAMMING OF MACHINE LEARNING STATE MACHINES

(71) Applicant: Deere & Company, Moline, IL (US)

(72) Inventor: Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/233,256

(22) Filed: Aug. 11, 2023

(65) Prior Publication Data

US 2023/0385083 A1 Nov. 30, 2023

Related U.S. Application Data

(63) Continuation of application No. 17/408,866, filed on Aug. 23, 2021, now Pat. No. 11,755,345.

(51) Int. Cl.
*G06F 8/35* (2018.01)
*G06F 8/34* (2018.01)
(Continued)

(52) U.S. Cl.
CPC ............. *G06F 8/34* (2013.01); *G06F 9/451* (2018.02); *G06F 11/3608* (2013.01);
(Continued)

(58) Field of Classification Search
CPC .......... G06N 3/04; G06N 20/00; G06N 3/045; G06T 11/206; G06F 9/451; G06F 8/34; G06F 17/12; G05D 1/0272
See application file for complete search history.

(56) References Cited

U.S. PATENT DOCUMENTS

| 2005/0209983 A1* | 9/2005 | MacPherson | G06T 11/206 |
| 2007/0018986 A1* | 1/2007 | Hauser | G06T 11/206 345/440 |

(Continued)

FOREIGN PATENT DOCUMENTS

CN 110225368 9/2019

OTHER PUBLICATIONS

Wang, Tong-qing, CN 111736969A, (translation) Oct. 2, 2020, 16 pgs <CN_111736969.pdf>.*

(Continued)

*Primary Examiner* — Tuan A Vu
(74) *Attorney, Agent, or Firm* — Hanley, Flight & Zimmerman, LLC (57) ABSTRACT

Implementations are disclosed for facilitating visual programming of machine learning state machines. In various implementations, one or more graphical user interfaces (GUIs) may be rendered on one or more displays. Each GUI may include a working canvas on which a plurality of graphical elements corresponding to at least some of a plurality of available logical routines are manipulable to define a machine learning state machine. One or more of the available logical routines may include logical operations that process data using machine learning model(s). Two or more at least partially redundant logical routines that include overlapping logical operations may be identified, and overlapping logical operations of the two or more at least partially redundant logical routines may be merged into a consolidated logical routine. At least some of the logical operations that were previously downstream from the overlapping logical operations may be logically coupled with the consolidated logical routine.

20 Claims, 5 Drawing Sheets

(51) Int. Cl.
   *G06F 9/451*      (2018.01)
   *G06F 11/36*      (2006.01)
   *G06N 3/042*      (2023.01)
   *G06N 3/045*      (2023.01)
   *G06N 20/00*      (2019.01)
   *G06F 17/12*      (2006.01)
   *G06Q 30/0241*    (2023.01)
   *G06T 11/20*      (2006.01)
   *G07G 5/00*       (2006.01)

(52) U.S. Cl.
   CPC ............. *G06N 3/042* (2023.01); *G06N 3/045* (2023.01); *G06N 20/00* (2019.01); *G06F 17/12* (2013.01); *G06Q 30/0277* (2013.01); *G06T 11/206* (2013.01); *G07G 5/00* (2013.01)

(56) References Cited

U.S. PATENT DOCUMENTS

| | | | |
|---|---|---|---|
| 2014/0047421 A1* | 2/2014 | Shimizu | G06F 17/12 717/149 |
| 2019/0286973 A1* | 9/2019 | Kovvuri | G06N 3/04 |
| 2020/0027137 A1 | 1/2020 | Miller | |
| 2020/0074432 A1 | 3/2020 | Valdman | |
| 2021/0034813 A1 | 2/2021 | Wu | |
| 2021/0150341 A1 | 5/2021 | Dalli | |
| 2021/0158041 A1* | 5/2021 | Chowdhary | G05D 1/0272 |
| 2021/0232902 A1* | 7/2021 | Gupta | G06N 3/045 |
| 2023/0057168 A1 | 2/2023 | Li | |

OTHER PUBLICATIONS

JP 6007430, (translation), Oct. 12, 2016, 11 pgs <JP_6007430.pdf>.*

Wang et al., CN 110956272A, (translation), Apr. 3, 2020, 72 pgs <CN_110956272A.pdf>.*

Badajide et al.; Redundant Feature Pruning for Accelerated Inference in Deep Neural Networks; 29 pages; dated Feb. 24, 2019.

"What is the Azure Machine Learning designer?" Azure Machine Learning. Microsoft Docs. Retrieved from https://docs.microsoft.com/en-us/azure/machine-learning/concept-designer. Dated Jun. 11, 2021.

Dudley et al., "A Review of User Interface Design for Interactive Machine Learning" ACM Transactions on Interactive Intelligent Systems, vol. 1, No. 1, Article 1. 37 Pages. Publication date: Mar. 2018.

"Kubeflow Overview: How Kubeflow helps you organize your ML workflow" KubeFlow. Retrieved from https://www.kubeflow.org/docs/started/kubeflow-overview/. 5 Pages. Dated Jun. 16, 2021.

Lakshmi Narayana Santha, "AutoML-A GUI Application to Make ML for Everyone" Automated Machine Learning. Retrieved from https://towardsai.net/p/automl/automl%E2%80%8A-%E2%80%8A-gui-application-to-make-ml-for-everyone. 22 Pages. Dated Jun. 25, 2021.

Semi Koen, "Architecting a Machine Learning Pipeline How to build scalable ML systems" Retrieved from https://towardsdatascience.com/architecting-a-machine-learning-pipeline-a847f094d1c7. 22 Pages. Dated Jun. 25, 2021.

Sean McClure, "GUI-fying the Machine Learning Workflow: Towards Rapid Discovery of Viable Pipelines" Towards Data Science. Retrieved from https://towardsdatascience.com/gui-fying-the-machine-learning-workflow-towards-rapid-discover-of-viable-pipelines-cab2552c909f. 36 pages. Dated Jun. 25, 2018.

"Overview-Deep Learning Studio" Retrieved from https://docs.deepcognition.ai/overview. 2 pages. Dated May 10, 2021.

Tamilselvam et al., "A Visiual Programming Paradigm for Abstract Deep Learning Model Development" arXiv: 1905.02486v2 [cs.HC] 12 Pages. Dated Aug. 19, 2019.

* cited by examiner

VISUAL PROGRAMMING OF MACHINE LEARNING STATE MACHINES

BACKGROUND

Designing and implementing complex, machine learning-based data processing pipelines typically requires a significant amount of engineering effort, as well as expertise in data science and computer programming. These requirements may raise significant barriers to entry in industries where such expertise may be uncommon, such as in manufacturing, or in agriculture where farmers, growers, co-ops, etc., may still rely on human-based phenotyping of their crops. With the agricultural industry in particular, the rise of precision agriculture—enabled at least in part by increased capability, availability, and affordability of agricultural robots and unmanned aerial vehicles (UAVs)—has made machine learning-based phenotyping increasingly crucial to remain competitive. Agricultural personnel may desire phenotypical inferences quickly so that they can make responsive decisions and/or take remedial actions at a competitive pace.

SUMMARY

Implementations are described herein for facilitating visual programming of machine learning state machines. More particularly, but not exclusively, implementations are described herein for providing a graphical user interface (GUI) that is operable to visually design and implement a machine learning state machine that includes at least some aspect of machine learning. In some implementations, techniques described herein may reduce or eliminate redundancies in machine learning state machines defined using GUIs configured with selected aspects of the present disclosure. This is particularly beneficial where the redundancies involve computationally-complex machine learning-based computations. In some such implementations, two or more logical routines corresponding to two or more graphical elements may be identified as including at least partially redundant logical operations. These at least partially redundant logical operations may be merged to reduce computational cost, latency, etc.

In some implementations, a method may be implemented using one or more processors and may include: causing one or more GUIs to be rendered on one or more displays, wherein each GUI of the one or more GUIs includes a working canvas on which a plurality of graphical elements corresponding to at least some of a plurality of available logical routines are manipulable to define a machine learning state machine, and wherein one or more of the available logical routines includes logical operations that process data using one or more machine learning models; identifying, as two or more at least partially redundant logical routines, two or more of the plurality of available logical routines that include overlapping logical operations; merging the overlapping logical operations of the two or more at least partially redundant logical routines into a consolidated logical routine; and logically coupling at least some of the logical operations that were previously downstream from the overlapping logical operations with the consolidated logical routine.

In various implementations, the logically coupling may include logically coupling two or more of the available logical routines that were previously downstream from the two or more at least partially redundant logical routines with the consolidated logical routine. In various implementations, the overlapping logical operations may include application of the same machine learning model to the same data.

In various implementations, the plurality of graphical elements may include nodes of a graph, wherein edges of the graph represent logical couplings between the logical routines of the plurality of available logical routines that are represented by the nodes of the graph. In various implementations, the identifying, merging, and logically coupling may be performed during compilation of source code that is generated based on a spatial arrangement of the plurality of graphical elements on the working canvas. In various implementations, the method may include adding a new graphical element that corresponds to the consolidated logical routine to the working canvas in response to the merging.

In various implementations, the one or more GUIs may include a first GUI with a first working canvas and a second GUI with a second working canvas; a first plurality of graphical elements may be arranged on the first working canvas to define a first machine learning state machine; a second plurality of graphical elements may be arranged on the second working canvas to define a second machine learning state machine that is distinct from the first machine learning state machine; a first at least partially redundant logical routine of the two or more at least partially redundant logical routines may correspond to one of the first plurality of graphical elements arranged on the first working canvas; and a second at least partially redundant logical routine of the two or more at least partially redundant logical routines may correspond to one of the second plurality of graphical elements arranged on the second working canvas.

In various implementations, the consolidated logical routine is shared between the first and second machine learning state machines. In various implementations, the machine learning state machine comprises an agricultural state machine, and the one or more machine learning models include a phenotyping agricultural machine learning model.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for facilitating visual programming of machine learning state machines. More particularly, but not exclusively, implementations are described herein for providing a graphical user interface (GUI) that is operable to visually design and implement a machine learning state machine that includes at least some aspect of machine learning. In the agricultural domain, for instance, the state machine may be an agricultural state machine that includes at least one phenotyping agricultural machine learning model. Such a machine learning state machine may be used to generate a computer program—written in an underlying programming and/or scripting language—that includes application of complex machine learning algorithms. Nonetheless, the visual programming implementations described herein free expert and non-expert users alike from these technical details, allowing them to design machine learning state machines, in an intuitive manner, without requiring underlying data science or computer programming expertise.

In various implementations, a GUI configured with selected aspects of the present disclosure may include a working canvas on which users are able to manipulate graphical elements to define a machine learning state machine. The user-defined arrangement of graphical elements may be used to generate source code that includes one or more machine learning operations. In some implementations, this source code may be written in a relatively low level programming language like C or C++, and may be compiled into an executable computer program. In other implementations in which the source code is a higher level scripting language, the source code may be interpreted (which may involve just-in-time compilation).

Each graphical element may correspond to a logical routine that is intuitively understandable by non-experts and experts alike (e.g., agricultural personnel), such as "fruit counter," "crop yield predictor," and so forth. Each logical routine may include one or more logical operations (e.g., lines of code, commands, batch or command line commands, etc.) that may or may not be separable from each other (e.g., extractable from the logical routine). In some implementations, the graphical elements may be rendered as nodes that can be connected with edges that represent logical couplings between the logical routines underlying the nodes. For example, output of a first node may be provided as an input to a second node based on an edge that runs from the first node to the second node. In various implementations, the nodes and edges may be manipulable relative to each other, e.g., by dragging and dropping, resizing, moving, etc., to allow the user to make changes to the machine learning state machine.

Machine learning state machines tend to be computationally expensive to execute, even when designed by experts to be as efficient as possible. For instance, the aspects of computational phenotyping that involve machine learning, such as plant part (e.g., fruit) recognition and segmentation, may be computationally expensive. However, sufficiently-capable computational resources may not necessarily be available at the "edge" (e.g., at or near where crops are grown) of a computing infrastructure, leading to reliance on cloud-based computing and its inherent latency. Enabling non-experts to design machine learning state machines may exacerbate these issues.

Accordingly, techniques are disclosed herein for reducing the computational complexity and/or latency associated with execution of machine learning state machines while still enabling non-experts to design them in an intuitive manner. In some implementations, techniques described herein may reduce or eliminate redundancies in machine learning state machines defined using GUIs configured with selected aspects of the present disclosure. This is particularly beneficial where the redundancies involve computationally-complex machine learning-based phenotyping. In some such implementations, two or more logical routines corresponding to two or more graphical elements may be identified as including redundant logical operations. These redundant logical operations may be merged to reduce computational cost, latency, etc.

As an example, suppose logical routines underlying both a "fruit counter" graphical element and a "fruit health monitor" graphical element rely on logical operations that apply an object recognition machine learning model (which may be hidden from the user in some cases, and therefore may be referred to herein as "latent"). Such a latent machine learning model may take the form of, for instance, a convolutional neural network (CNN) trained to detect fruit. If both these graphical elements are included in a single agricultural state machine, during operation of the agricultural state machine, the same latent object recognition machine learning model may be applied twice to the same data (e.g., two-dimensional imagery of plants captured by agricultural robot(s)). Alternatively, two distinct agricultural state machines created for the same agricultural entity (e.g., farm, co-op, etc.), e.g., by different users, may each include one of these graphical elements. If both state machines are operated to process the same data, redundant application of the object recognition machine learning model may occur.

Accordingly, in various implementations, overlapping logical operations of these at least partially redundant logical routines may be identified. In some implementations, these overlapping logical operations may be merged into a consolidated logical routine. This may or may not cause a new graphical element corresponding to the consolidated logical routine to be generated and/or added to the working canvas of the GUI.

In various implementations, at least some logical operations that were previously downstream from the overlapping logical operations, such as logical operations of downstream logical routines—or even logical operations that occur after the overlapping logical operations within the redundant logical routines—may be logically coupled (e.g., via automatically-generated source code fragments sometimes referred to as "glue code") with the consolidated logical routine. Consequently, distinct sets of downstream logical operations that relied on output of the overlapping logical operations may still receive their input data, albeit from a single upstream source.

Merging overlapping logical operations into consolidated logical routines may be particularly beneficial (e.g., reduce computational complexity, latency) where those overlapping logical operations raise a computational bottleneck. For example, the overlapping logical operations may include application of the same phenotyping machine learning model to the same agricultural data, which as noted previously tend to be computationally expensive.

Figure 1:
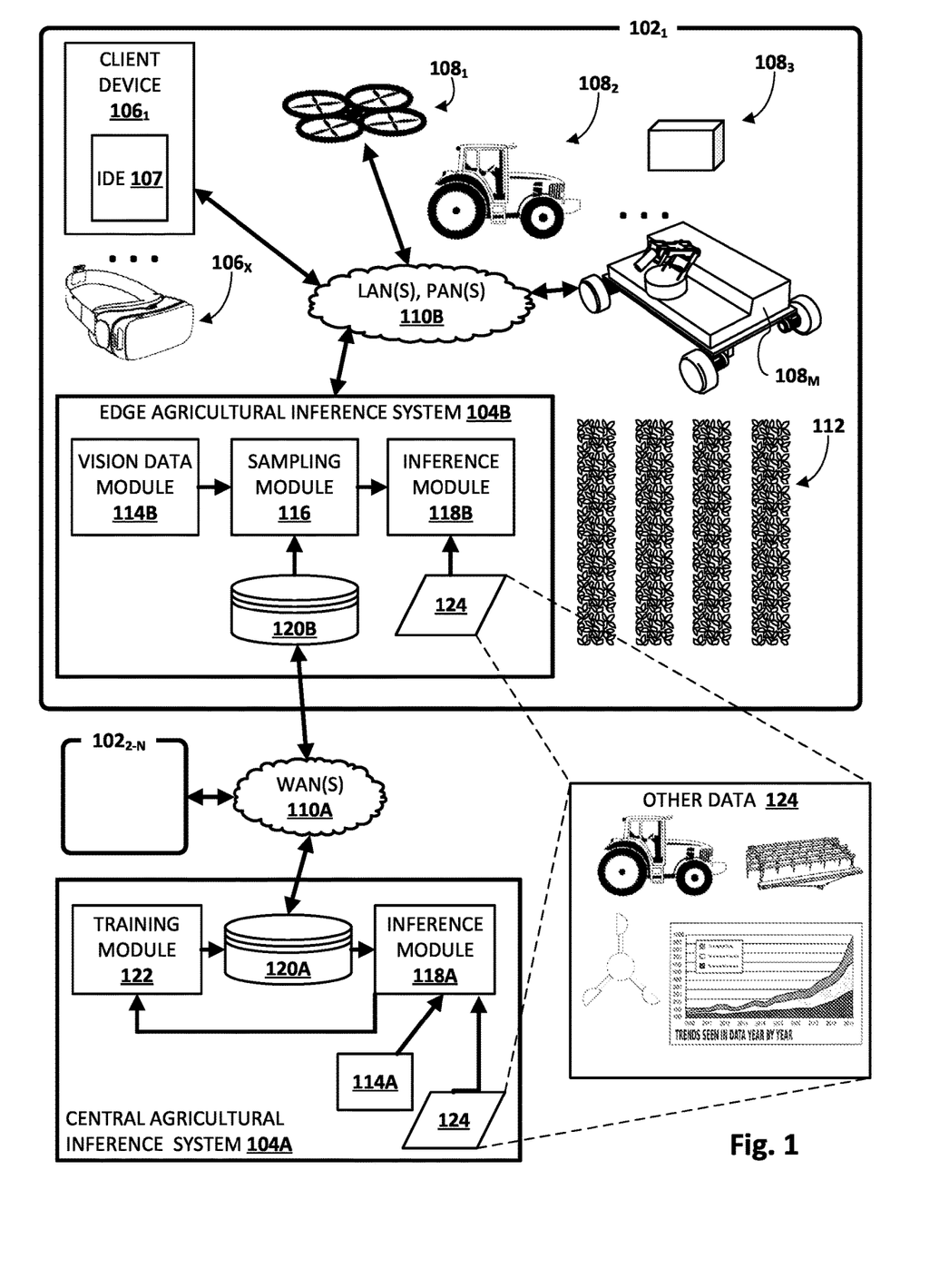
FIG. 1 schematically depicts an example environment in which disclosed techniques may be employed in accordance with various implementations.

FIG. 1 schematically illustrates one example environment in which one or more selected aspects of the present disclosure may be implemented, in accordance with various implementations. The example environment depicted in FIG. 1 relates to the agriculture domain, which as noted previously is a beneficial domain for implementing selected aspects of the present disclosure. However, this is not meant to be limiting. Techniques described here may be useful in any domain that would benefit from allowing experts and non-experts alike to be able to create machine learning state machines. As one non-limiting example, scientists and researchers deployed in remote locations such as in space, in the Antarctic, in remote jungle regions, etc., may be experts in fields like physics, biology, chemistry, etc. However, they may only have surface-level understanding of how machine learning works. With GUIs configured with selected aspects of the present disclosure, however, these scientists and researchers can create their own machine learning state machines, e.g., by dragging and dropping intuitively-labeled elements into a visual process flow. With the techniques described herein for merging redundant operations, these non-expert-create machine learning state machines may be made more efficient computationally, e.g., so that it is feasible to execute them at or near an edge of a distributed computing environment.

The environment of FIG. 1 includes a plurality of edge sites $102_{1-N}$ (e.g., farms, fields, plots, or other areas in which crops are grown) and a central agricultural inference system 104A. Additionally, one or more of the edge sites 102, including at least edge site $102_1$, includes an edge agricultural inference system 104B, a plurality of client devices $106_{1-X}$, human-controlled and/or autonomous farm equipment $108_{1-M}$, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, berries, grapes, and so forth.

One edge site $102_1$ is depicted in detail in FIG. 1 for illustrative purposes. However, as demonstrated by additional edge sites $102_{2-N}$, there may be any number of edge sites 102 corresponding to any number of farms, fields, or other areas in which crops are grown, and for which agricultural inferences such as crop yield predictions may be of interest. Each edge site 102 may include the same or similar components as those depicted in FIG. 1 as part of edge site $102_1$.

In various implementations, components of edge sites $102_{1-N}$ and central agricultural inference system 104A collectively form a distributed computing network in which edge nodes (e.g., client device 106, edge agricultural inference system 104B, farm equipment 108) are in network communication with central agricultural inference system 104A via one or more networks, such as one or more wide area networks ("WANs") 110A. Components within edge site $102_1$, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth), indicated generally at 110B.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central agricultural inference system 104A and edge agricultural inference system 104B (collectively referred to herein as "agricultural inference system 104") comprise an example of a distributed computing network for which techniques described herein may be particularly beneficial. Each of client devices 106, agricultural inference system 104, and/or farm equipment 108 may include one or more memories for storage of data and software applications, one or more processors for accessing data and executing applications, and other components that facilitate communication over a network. The computational operations performed by client device 106, farm equipment 108, and/or agricultural inference system 104 may be distributed across multiple computer systems.

Each client device 106 and some farm equipment 108 may operate a variety of different applications that may be used, for instance, to obtain and/or analyze various agricultural inferences (real time and delayed) that were generated using techniques described herein. For example, a first client device $106_1$ operates integrated development environment (IDE) 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

Individual pieces of farm equipment $108_{1-M}$ may take various forms. Some farm equipment 108 may be operated at least partially autonomously, and may include, for instance, an unmanned aerial vehicle $108_1$ that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot $108_M$, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor $108_2$, may be autonomous, semi-autonomous, and/or human-driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

In some implementations, farm equipment 108 may take the form of one or more modular edge computing nodes $108_3$. An edge computing node $108_3$ may be a modular and/or portable data processing device and/or sensor package that, for instance, may be carried through an agricultural field 112, e.g., by being mounted on another piece of farm equipment (e.g., on a boom affixed to tractor $108_2$ or to a truck) that is driven through field 112 and/or by being carried by agricultural personnel. Edge computing node $108_3$ may include logic such as processor(s), application-specific integrated circuits (ASICs), field-programmable gate arrays (FPGA), etc., configured with selected aspects of the present disclosure to capture and/or process various types of sensor data to make agricultural inferences.

In some examples, one or more of the components depicted as part of edge agricultural inference system 104B may be implemented in whole or in part on a single edge computing node $108_3$, across multiple edge computing nodes $108_3$, and/or across other computing devices, such as client device(s) 106. Thus, when operations are described herein as being performed by/at edge agricultural inference system 104B, it should be understood that those operations may be performed by one or more edge computing nodes $108_3$, and/or may be performed by one or more other computing devices at the edge 102, such as on client device(s) 106.

In various implementations, edge agricultural inference system 104B may include a vision data module 114B, a sampling module 116, and an edge inference module 118B. Edge agricultural inference system 104B may also include one or more edge databases 120B for storing various data used by and/or generated by modules 114B, 116, and 118B, such as vision and/or other sensor data gathered by farm equipment $108_{1-M}$, agricultural inferences, machine learning models that are applied and/or trained using techniques described herein to generate agricultural inferences, and so forth. In some implementations one or more of modules 114B, 116, and/or 118B may be omitted, combined, and/or implemented in a component that is separate from edge agricultural inference system 104B.

In various implementations, central agricultural inference system 104A may be implemented across one or more computing systems that may be referred to as the "cloud." Central agricultural inference system 104A may receive massive sensor data generated by farm equipment $108_{1-M}$ (and/or farm equipment at other edge sites $102_{2-N}$) and process it using various techniques, including but not limited to application of machine learning state machines generated using techniques described herein, to make agricultural inferences.

However, the agricultural inferences generated by central agricultural inference system 104A may be delayed, e.g., by the time required to physically transport portable data devices (e.g., hard drives) from edge sites $102_{1-N}$ to central agricultural inference system 104A, and/or by the time required by central agricultural inference system 104A to computationally process this massive data. Agricultural personnel (e.g., farmers) at edge sites 102 may desire agricultural inferences much more quickly than this. Accordingly, in various implementations, aspects of machine learning state machines built using GUIs configured with selected aspects of the present disclosure may be implemented at edge agricultural inference system 104B if possible/feasible, and at central agricultural central system 104A if necessary/beneficial.

In some implementations, sampling module 116 may be configured to sample, e.g., from one or more sensors onboard one or more farm equipment $108_{1-M}$, or from vision data provided by vision data module 114B, sensor data. Sampling module 116 may provide this sampled sensor data to edge inference module 118B. In some implementations, the sensor data may be applied, e.g., continuously and/or periodically by edge inference module 118B, as input across one or more machine learning models stored in edge database 120B to generate output indicative of one or more targeted plant traits detected in/on one or more plants in the agricultural field 112.

Edge agricultural inference system 104B may process the targeted inference data at the edge using one or more of the machine learning models stored in database 120B, e.g., based on an agricultural state machine designed by a user using IDE 107. In some cases, one or more of these machine learning model(s) may be stored and/or applied directly on farm equipment 108, such as edge computing node $108_3$, to make a targeted inference about plants of the agricultural field 112.

In some implementations, edge agricultural inference system 104B may selectively (e.g., on an "as needed" basis) download and/or install trained models that are stored in database 120A of central agricultural inference system 104A. For example, if edge inference module 118B determines that a particular plant trait is detected, edge agricultural inference system 104B may download new machine learning model(s) that are trained to make inferences related to those detected plant traits. As one example, inference module 118B may apply a triage machine learning model to triage data to detect, generically, the presence of plant disease, without detecting which specific plant disease(s) are present. Then, inference module 118B may request and/or download, from central agricultural inference system 104A, one or more machine learning models that are trained to detect specific types of plant disease. Inference module 118B may then apply these newly-obtained model(s) to highly-detailed target inference data to determine which specific plant diseases are present. Then it is possible for agricultural personnel to practice more finely-targeted remedial measures.

As noted previously, various types of machine learning models may be applied by inference modules 118A/B to generate crop yield predictions (real time and delayed). Additionally, various types of machine learning models may be used to generate image embeddings that are applied as input across the various machine learning models. These various models may include, but are not limited to, RNNs, LSTM networks (including bidirectional), transformer networks, feed-forward neural networks, CNNs, support vector machines, random forests, decision trees, etc.

Additionally, other data 124 may be applied as input across these models besides sensor data or embeddings generated therefrom. Other data 124 may include, but is not limited to, historical data, weather data (obtained from sources other than local weather sensors), data about chemicals and/or nutrients applied to crops and/or soil, pest data, crop cycle data, previous crop yields, farming techniques employed, and so forth. Weather data may be obtained from various sources other than sensor(s) of farm equipment 108, such as regional/county weather stations, etc. In implementations in which local weather and/or local weather sensors are not available, weather data may be extrapolated from other areas for which weather data is available, and which are known to experience similar weather patterns (e.g., from the next county, neighboring farms, neighboring fields, etc.).

In this specification, the term "database" and "index" will be used broadly to refer to any collection of data. The data of the database and/or the index does not need to be structured in any particular way and it can be stored on storage devices in one or more geographic locations. Thus, for example, database(s) 120A and 120B may include multiple collections of data, each of which may be organized and accessed differently.

Figure 2A:
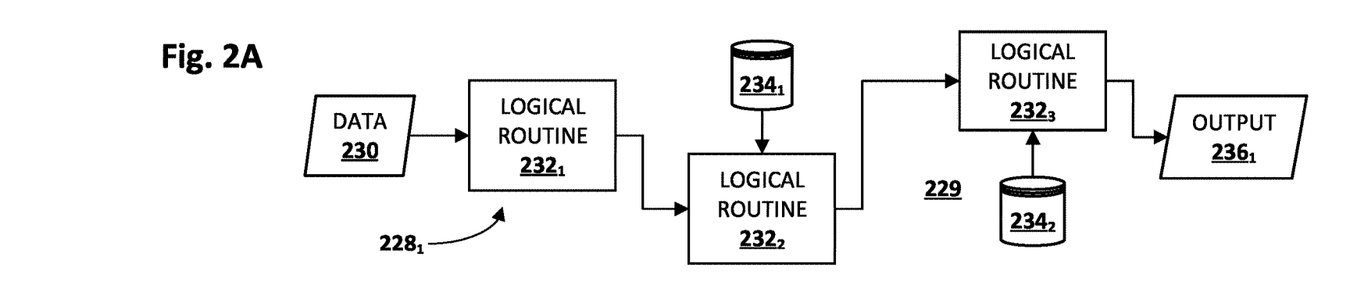
FIG. 2A, FIG. 2B, and FIG. 2C schematically depict an example of how redundant logical routines of machine learning state machines may be consolidated, in accordance with the present disclosure.
Figure 2B:
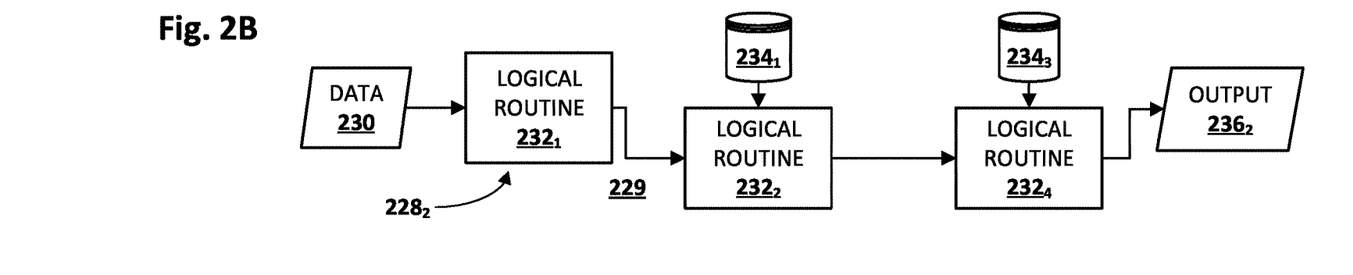
Figure 2C:
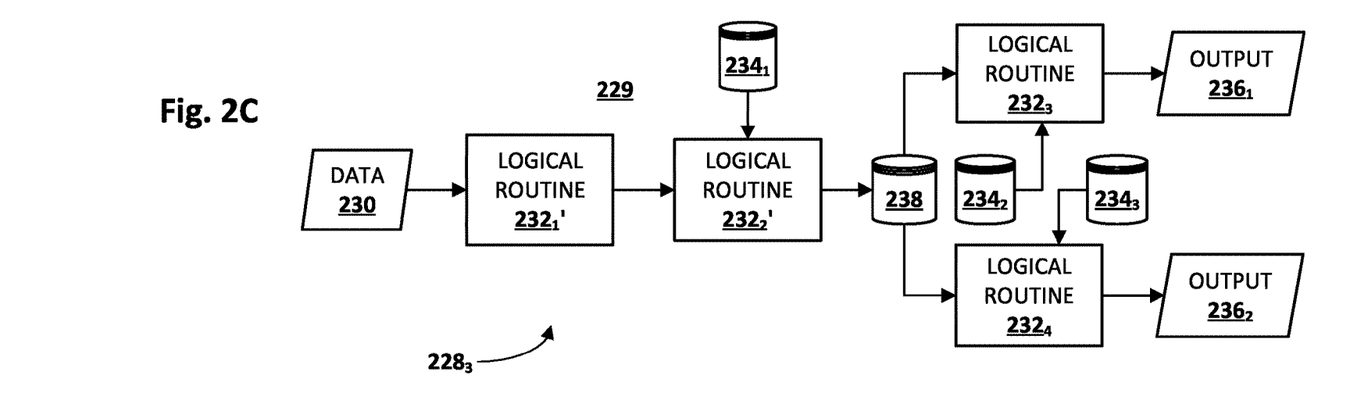

FIGS. 2A-C schematically depict an example of how redundant operations of machine learning state machines may be merged and/or consolidated to conserve computing resources. The machine learning state machines are depicted in FIGS. 2A-C as graphs rendered on a working canvas 229 of a GUI configured with selected aspects of the present disclosure. The graphs depicted in this example are directed, but that is not required. In some implementations, a user operating a GUI configured with selected aspects of the present disclosure (e.g., IDE 107 for visually creating machine learning data processing pipelines) may be presented with a working canvas (indicated at 229 in FIGS. 2A-C) on which visual graphs that resemble those depicted in FIGS. 2A-C are rendered. Constituent elements of these visual graphs, such as their nodes and/or edges, may be manipulable by the user, e.g., using a touch screen, a mouse and keyboard, etc. The different machine learning state machines depicted in FIGS. 2A-B may, for instance, be implemented as separate processes on the same computing device (e.g., edge computing node $108_3$), and/or may have been created by different people for different purposes (in some cases without one being aware of the other).

FIG. 2A depicts a first machine learning state machine $228_1$ that operates on data 230. Data 230 is first processed by a first logical routine $232_1$. First logical routine $232_1$ may, for instance, preprocess data 230 in order to provide suitable pre-processed data to a second logical routine $232_2$. For example, first logical routine $232_1$ may extract various features from data 230 and assemble a feature vector that encodes these features in a structured way that is capable of being processed by downstream component(s).

Second logical routine $232_2$ may process the output of first logical routine $232_1$ using a first machine learning model $234_1$ to generate, for instance, one or more inferences, probabilities, annotations, statistics, etc. The output of second logical routine $232_2$ may be processed by a third logical routine $232_3$, e.g., using a second machine learning model $234_2$, to generate first output $236_1$. Depending on the application or design of first machine learning state machine $228_1$, first output $236_1$ may take various forms, such as one or more inferences, probabilities, annotations, statistics, etc.

FIG. 2B depicts a second machine learning state machine $228_2$ that operates on the same type of data 230 as first machine learning state machine $228_1$. Like first machine learning state machine $228_1$, second machine learning state machine $228_2$ includes first logical routine $232_1$ that performs the same preprocessing of data 230 as was described previously. Second machine learning state machine $228_2$ also includes the same second logical routine $232_2$ as first machine learning state machine $228_1$, which processes the preprocessed data using the same first machine learning model $234_1$. However, unlike first machine learning state machine $228_1$, second machine learning state machine $228_2$ includes a fourth logical routine $232_4$ that is different from third logical routine $232_3$ of first machine learning state machine $228_1$, and which relies on a third machine learning model $234_3$. Consequently, the second output $236_2$ generated by second machine learning state machine $228_2$ differs from first output $236_1$ generated by first machine learning state machine $228_1$.

Despite this difference, it can be seen that first machine learning state machine $228_1$ and second machine learning state machine $228_2$ have much in common, including logical routines $232_{1-2}$. Implementing both of these state machines in full may result in redundant logical operations—namely those forming first logical routine $232_1$ and second logical routine $232_2$—being executed multiple times. Given that many edge-computing environments include resource-constrained computing devices (e.g., edge computing node $108_3$), these redundant operations may impose significant burdens and/or delays. This is especially likely with second logical routine $232_2$ because it relies on application of machine learning. Even if hardware tailored towards machine learning, such as TPUs, GPUs, etc., is implemented at the edge, these computations can quickly overwhelm constrained edge computing resources.

Accordingly, in various implementations, overlapping logical operations of two or more at least partially redundant logical routines, such as first logical routine $232_1$ and second logical routine $232_2$, may be merged into a consolidated logical routine. An example of this is depicted in FIG. 2C. A third, "consolidated" machine learning state machine 2283 is depicted in FIG. 2C that includes a consolidated first logical routine $232_1'$ followed by a consolidated second logical routine $232_2'$. Consolidated logical routines $232_{1-2}'$ may be identical to logical routines $232_{1-2}$. However, instead of being implemented twice in two different state machines, they are implemented once, and the output generated by consolidated second logical routine $232_2'$ is stored at least temporarily in a midstream database 238.

In FIG. 2C, at least some of the logical operations that were previously downstream from the overlapping logical operations of first and second logical routines $232_{1-2}$ have been logically coupled (e.g., via glue code, API calls, etc.) with the consolidated logical routines $232_{1-2}'$, e.g., by way of being logically coupled with midstream database 238. Consequently, both third logical routine $232_3$ and fourth logical routine $232_4$ have access to the same input data they had previously, and are able to generate the same respective outputs, $236_{1-2}$.

At least temporarily storing data in midstream database 238 that is accessible to multiple machine learning state machines may give rise to various benefits. First machine learning state machine $228_1$ and second machine learning state machine $228_2$ may be implemented on different computing devices (e.g., different computing nodes 108 affixed to different farm machinery). Nonetheless, if midstream database 238 is available at or near the edge of a distributed computing environment such as that depicted in FIG. 1, both of these computing devices may have access to the data stored in midstream database 238, e.g., by way of one or more LANs, PANs (e.g., 110B), mesh networks, etc. Depending on the type of data being processed and the type of inferences being made, the portions of first and second logical routines $232_{1-2}$ that are different from each other (on the right-hand side in FIGS. 2A-C) can access data stored in midstream database synchronously or even asynchronously.

Figure 3A:
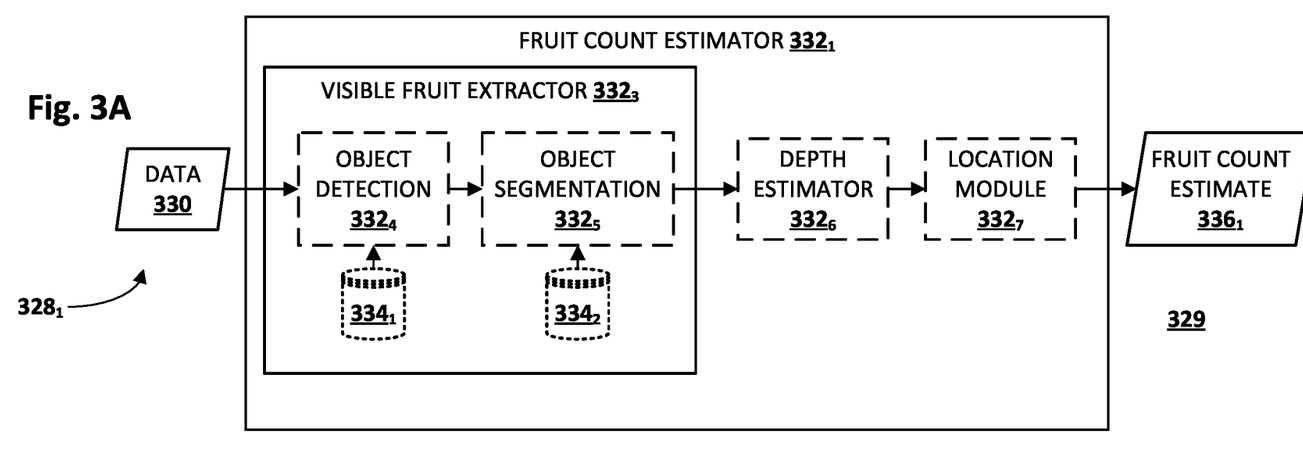
FIG. 3A and FIG. 3B schematically depict an example of multiple agricultural state machines to which selected aspects of the present disclosure may be applied.
Figure 3B:
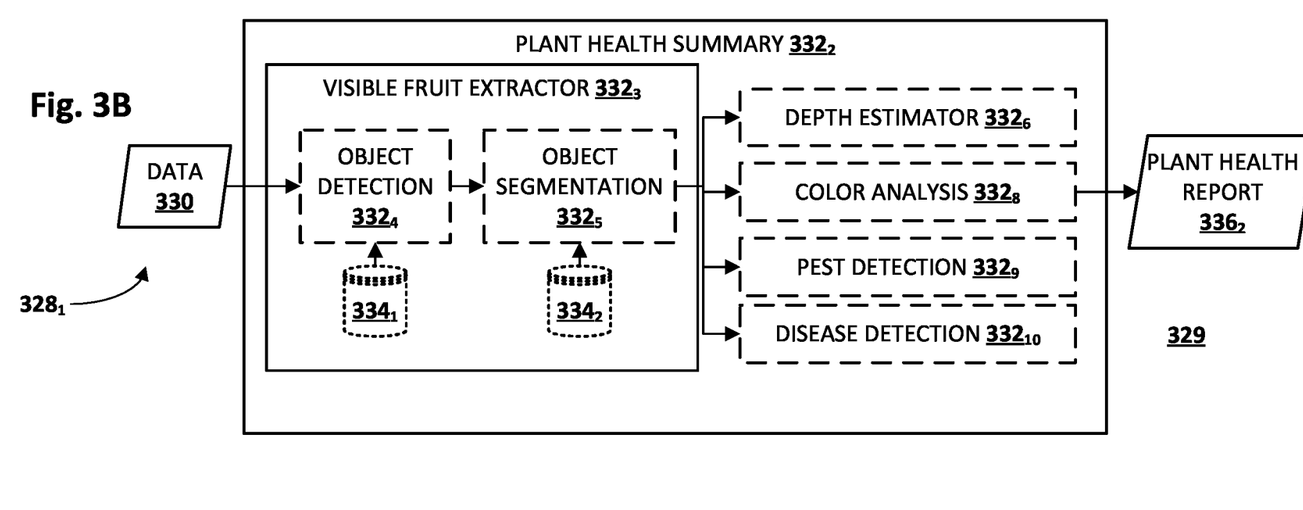

FIGS. 3A and 3B schematically depict another example of manipulable visual graphs representing machine learning state machines that may be presented to a user, e.g., on a canvas 329 of a GUI configured with selected aspects of the present disclosure. FIG. 3A depicts a first agricultural state machine $328_1$ and FIG. 3B depicts a second agricultural state machine $328_2$. These agricultural state machines $328_{1-2}$ may have been visually designed, for instance, by separate users who may or may not even be aware of each other. These agricultural state machines $328_{1-2}$ may or may not be implemented in separate computing environments, such as on two different modular computing nodes (e.g., $108_3$) affixed to different farm equipment (e.g., one to a tractor $108_2$, another to an agricultural robot $108_M$). FIGS. 3A and 3B demonstrate how techniques described herein may be beneficial for non-expert users. For example, FIGS. 3A and 3B demonstrate how relatively complex concepts such as machine learning may be encapsulated into intuitive, hierarchical elements such as a "Fruit Count Estimator" logical routine $332_1$ and a "Plant Health Summary" logical routine $332_2$ at one level, and/or a "Visible Fruit Exactor" logical routine $332_3$ at another level.

In FIG. 3A, data 330 may take the form of, for instance, vision data captured by a vision sensor that is carried through one or more fields. This vision data 330 may depict crops from various angles (e.g., overhead, from the side, etc.) and/or in various resolutions and/or wavelengths. Data 330 is first processed by Visible Fruit Extractor logical routine $332_3$, which itself includes an object detection logical routine $332_4$ and an object segmentation logical routine $332_5$. Object detection logical routine $332_4$ may utilize one or more machine learning models, such as a convolutional neural network (CNN) $334_1$, to identify one or more objects, such as fruits, flowers, nuts, etc. These identifications may take various forms, such as bounding shape annotations and/or pixel-wise annotations. Object segmentation logical routine $332_5$ may or may not also rely on one or more machine learning models, such as another CNN 3342.

Fruit Count Estimator logical routine $332_1$ may be designed to estimate a current count of fruit in a particular location, such as field 112. Accordingly, downstream of visible fruit extractor logical routine $332_3$ are a depth estimator logical routine $332_6$ and a location module logical routine $332_7$.

Depth estimator logical routine $332_6$ may be configured to analyze vision data to estimate a distance between one or more vision sensors and one or more aspects of crops and/or areas surrounding crops. For example, if the vision sensor captures crops from overhead, depth estimator logical routine $332_6$ may estimate depths to visible portions of crops and/or to the ground. From these depth estimations, depth estimator logical routine $332_6$ (or another, un-depicted logical routine) may, for instance, extrapolate total fruit counts for a plant based on a height of the plant (calculated using a difference between a distance to a top of the plant's canopy and the ground) and a count of visible fruits (e.g., those fruit that are visible from overhead, not occluded by leaves or other fruit) in one or more frames of vision data.

Location module logical routine $332_7$ may be configured to cluster fruit count estimates based on geographic locations. For example, fruit count estimates associated with individual frames of vision data 330 may be clustered based on geo-coordinates (e.g., GPS coordinates) associated with those frames. In this way, Fruit Count Estimator $332_1$ is able to generate a fruit count estimate $336_1$ for a particular geographic area, such as a field, a part of a field such as a row, etc.

Plant Health Summary logical routine $332_2$ operates on the same data 330 as Fruit Count Estimator logical routine $332_1$. Instead of estimating fruit counts, however, Plant Health Summary logical routine $332_2$ is configured to generate a plant health report $336_2$ that includes various pieces of data and/or inferences indicative of plant health. To this end, Plant Health Summary logical routine $332_2$ also includes a visible fruit extractor logical routine $332_3$, same as Fruit Count Estimator $332_1$. However, the downstream logical routines are different. Plant Health Summary logical routine $332_2$ provides input data for various logical routines, including depth estimator logical routine $332_6$, color analysis logical routine $332_8$, pest detection logical routine $332_9$, and disease detection logical routine $332_{10}$.

Depth estimator logical routine $332_6$ may perform a similar role as it performed in Fruit Count Estimator logical routine $332_1$, except that an aspect of its output, plant height, may be used as a measure of plant health. Color analysis logical routine $332_8$ may be configured to analyze colors of fruits that were detected by objection detection logical routine $332_4$ and segmented by object segmentation logical routine $332_5$. Additionally or alternatively, color analysis logical routine $332_8$ may be configured to analyze color of non-fruit parts of plants or their surroundings (e.g., pixels of vision data 330 not annotated as fruit), such as leaves, flowers, stems, underlying dirt, etc.

Pest detection logical routine $332_9$ may be configured to detect pest infestation (e.g., by detecting the pests and/or the damage they cause), e.g., on segmented fruit portions of vision data 330 or on portions (e.g., pixels) of vision data 330 not annotated as fruit. Pests or may include, for instance, various types of insects (e.g., aphids), snails and slugs, mammals such as deer, birds (which may damage or totally destroy fruit), and so forth. Disease detection logical routine $332_{10}$ may perform a similar role as pest detection logical routine $332_9$, except it may detect diseases (e.g., fungus, bacteria, viruses, etc.). In some implementations, one or both of pest detection logical routine $332_9$ and disease detection logical routine $332_{10}$ may utilize one or machine learning models (not depicted) such as CNNs to detect pests and/or disease, although this is not required.

As was the case with first and second machine learning state machines $228_{1-2}$ in FIGS. 2A-B, there is redundancy between Fruit Count Estimator logical routine $332_1$ and Plant Health Summary logical routine $332_2$. Both include visible fruit extractor logical routine $332_3$, which operates on the same vision data 330. Accordingly, in various implementations, various aspects of logical routines $332_1$ and $332_2$ may be consolidated to reduce expenditure of computing resources.

One option would be to use a single instance of visible fruit extractor logical routine $332_3$ to add annotations (e.g., bounding shapes, pixel-wise annotations) to vision data 330, and then store that annotated vision data at least temporarily in a database, such as midstream database 238 in FIG. 2C. Downstream logical routines that depend on this data, including $332_{6-10}$ in FIGS. 3A-B, may then be logically coupled (e.g., reprogrammed, rerouted) with such a temporary holding database, synchronously or asynchronously. Another option would eliminate an even larger portion of Fruit Count Estimator logical routine $332_1$ by logically coupling an instance of location module logical routine $332_7$ to the instance of depth estimator logical routine $332_6$ that is part of Plant Health Summary logical routine $332_2$ in FIG. 3B.

As noted previously, in various implementations, the working canvases 329 of FIGS. 3A and 3B, as well as the working canvases 229 of FIGS. 2A-C, may be usable to create, edit, manipulate, or otherwise act upon graphs (undirected or directed) that define machine learning state machines such as $232_{1-3}$ or $332_{1-2}$. In some implementations, the graphical elements forming these graphs, including the nodes, may be drawn (e.g., dragged) from a library of available logical routines at various hierarchical levels. The elements in these libraries may be defined to be relatively intuitive, and may abstract out the underlying complexities of computer programming, machine learning, and/or data science from non-experts who may not understand it or be confused by it.

In FIGS. 3A and 3B, for instance, the node representing Fruit Count Estimator logical routine $332_1$ and the node representing Plant Health Summary logical routine $332_2$ may be two of several different nodes that are available to agricultural personnel. These various nodes may be used in isolation and/or logically coupled with each other using edges. In some implementations, nodes that are dependent on particular data being available may not be allowed to be logically coupled upstream from other nodes that make that particular data available. For example, without visible fruit extractor logical routine $332_3$, it may not be possible to use depth estimator logical routine $332_6$ and location module logical routine $332_7$ alone to define a state machine; such an attempt may result in the user receiving an error message.

Figure 4:
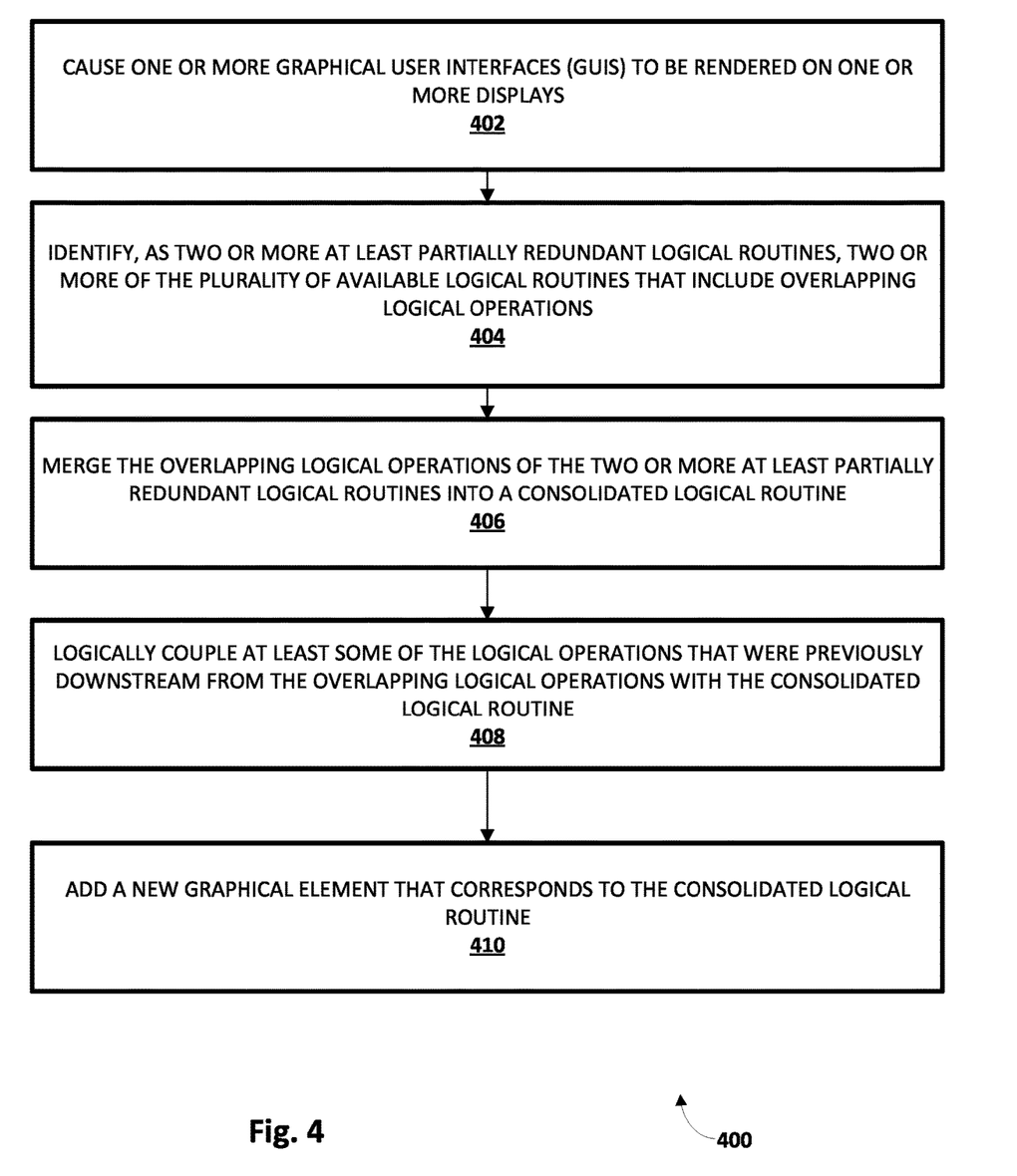
FIG. 4 is a flowchart of an example method in accordance with various implementations described herein.

FIG. 4 illustrates a flowchart of an example method 400 for practicing selected aspects of the present disclosure. For convenience, operations of method 400 will be described as being performed by a system configured with selected aspects of the present disclosure. Other implementations may include additional operations than those illustrated in FIG. 4, may perform operation(s) of FIG. 4 in a different order and/or in parallel, and/or may omit one or more of the operations of FIG. 4.

At block 402, the system may cause one or more graphical user interfaces (GUIs) to be rendered on one or more displays. In various implementations, each GUI of the one or more GUIs may include a working canvas (e.g., 229, 329) on which a plurality of graphical elements corresponding to at least some of a plurality of available logical routines are manipulable to define a machine learning state machine (e.g., $228_{1-3}$, $328_{1-2}$). At least some of the available logical routines may include logical operations (e.g., lines of code, commands, etc.) that process data using one or more machine learning models.

At block 404, the system may identify, as two or more at least partially redundant logical routines, two or more of the plurality of available logical routines that include overlapping logical operations. In FIGS. 2A and 2B, for instance, logical routines $232_{1-2}$ were identified as redundant between first machine learning state machine $228_1$ and second machine learning state machine $228_2$. In FIGS. 3A and 3B, visible fruit extractor logical routine $332_3$ may have been identified as redundant between Fruit Count Estimator logical routine $332_1$ and Plant Health Summary logical routine $332_2$.

At block 406, the system may merge the overlapping logical operations of the two or more at least partially redundant logical routines into a consolidated logical routine. For example, in FIG. 2C, logical routines $232_{1-2}$ are merged into consolidated logical routine $232_{1-2}'$. At block 408, the system may logically couple at least some of the logical operations that were previously downstream from the overlapping logical operations with the consolidated logical routine. In FIG. 2C, for instance, logical routines $232_3$ and $232_4$ are logically coupled to database 238, which itself receives output generated by consolidated logical routines $232_{1-2}'$. At block 410, the system may add a new graphical element to the canvas (e.g., 229, 329) that corresponds to the consolidated logical routine, e.g., $332_{1-2}'$ in FIG. 2C.

Machine learning state machines may take various forms. In some implementations, they may take the form of executable programs that are compiled from underlying source code. In some such implementations, the underlying source code may be generated and/or defined based on a spatial arrangement of a plurality of graphical elements (e.g., nodes, edges) on a working canvas (e.g., 229, 339) provided by a GUI configured with selected aspects of the present disclosure. In some such implementations, the identifying of block 404, the merging of block 406, and/or the logically coupling of block 408 may be performed during compilation of the underlying source code.

In other implementations, one or more of these operations may be performed prior to compilation, e.g., as part of a background daemon for IDE 107 used to develop/manipulate machine learning state machines. For example, the daemon may periodically and/or continuously monitor for redundant logical routines (even across multiple IDEs 107 executed separately by multiple different users), or for redundant logical operations within logical routines, and may consolidate operations on an ongoing basis (e.g., as the user edits the machine learning state machine). In some implementations, techniques described herein may cause suggestions (e.g., pop-up windows or annotations) to be presented to the user that show how functional blocks could be merged to reduce computational complexity, latency, etc.

Figure 5:
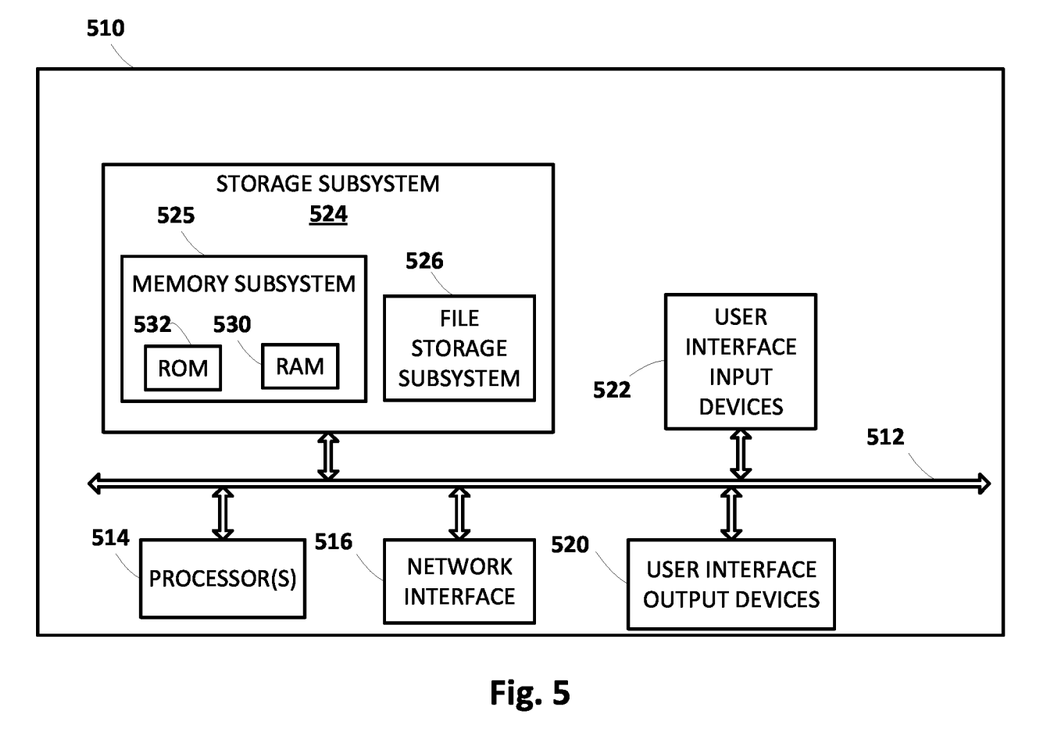
FIG. 5 schematically depicts an example architecture of a computer system.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 510 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method 400 described herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
causing one or more graphical user interfaces (GUIs) to be rendered on one or more displays, wherein each GUI of the one or more GUIs includes a working canvas on which a plurality of nodes corresponding to at least some of a plurality of available logical routines are manipulable to form a graph defining a machine learning state machine, wherein edges of the graph represent logical couplings between the logical routines of the plurality of available logical routines that are represented by the nodes of the graph;
identifying first and second partially redundant nodes in the graph, the first and second partially redundant nodes having at least one overlapping logical operation, the first partially redundant node having a first non-overlapping logical operation, the second partially redundant node having a second non-overlapping logical operation, wherein the at least one overlapping logical operation represents execution of one or more machine learning models;
merging the at least one overlapping logical operation of the first and second partially redundant nodes into a consolidated logical routine;
logically coupling the first non-overlapping logical operation with the consolidated logical routine; and
logically coupling the second non-overlapping logical operation with the consolidated logical routine.

2. The method of claim 1, wherein the logically coupling is performed during compilation of source code that is generated based on a state of the graph on the working canvas.

3. The method of claim 1, wherein the logically coupling the first non-overlapping logical operation with the consolidated logical routine includes generating glue code that provides output from the consolidated logical routine to the first non-overlapping logical operation.

4. The method of claim 1, further including adding a new graphical element that corresponds to the consolidated logical routine to the working canvas in response to the merging.

5. The method of claim 1, wherein the machine learning state machine includes an agricultural state machine, and the one or more machine learning models include a phenotyping agricultural machine learning model.

6. The method of claim 1, further including determining whether an upstream logical routine represented by an upstream node of the graph is dependent on data output by a downstream logical routine represented by a downstream node of the graph.

7. The method of claim 6, wherein the logically coupling is conditionally performed based on an outcome of the determining.

8. The method of claim 1, further including:
receiving an input instructing connection of two or more selected nodes of the graph with one or more edges;
determining that an upstream logical routine represented by an upstream node of the graph is dependent on data output by a downstream logical routine represented by a downstream node of the graph; and
in response to the determining, causing an error message to be output.

9. A system comprising one or more processors and memory storing instructions that, in response to execution of the instructions, cause the one or more processors to:
cause one or more graphical user interfaces (GUIs) to be rendered on one or more displays, wherein each GUI of the one or more GUIs includes a working canvas on which a plurality of nodes corresponding to at least some of a plurality of available logical routines are manipulable to form a graph defining a machine learning state machine, wherein edges of the graph represent logical couplings between the logical routines of the plurality of available logical routines that are represented by the nodes of the graph;

identify first and second partially redundant nodes in the graph, the first and second partially redundant nodes having at least one overlapping logical operation, the first partially redundant node having a first non-overlapping logical operation, the second partially redundant node having a second non-overlapping logical operation, wherein the at least one overlapping logical operation represents execution of one or more machine learning models;

merge the at least one overlapping logical operation of the first and second partially redundant nodes into a consolidated logical routine;

logically couple the first non-overlapping logical operation with the consolidated logical routine; and logically couple the second non-overlapping logical operation with the consolidated logical routine.

10. The system of claim 9, wherein the instructions to logically couple are executed during compilation of source code that is generated based on a state of the graph on the working canvas.

11. The system of claim 9, wherein the instructions to logically couple cause the one or more processors to generate glue code that is to provide output from the consolidated logical routine to the first non-overlapping logical operation.

12. The system of claim 9, wherein the instructions cause the one or more processors to add a new graphical element that corresponds to the consolidated logical routine to the working canvas in response to the merging.

13. The system of claim 9, wherein the machine learning state machine includes an agricultural state machine, and the one or more machine learning models include a phenotyping agricultural machine learning model.

14. The system of claim 9, wherein the instructions cause the one or more processors to make a determination of whether an upstream logical routine represented by an upstream node of the graph is dependent on data output by a downstream logical routine represented by a downstream node of the graph.

15. The system of claim 14, wherein the instructions to logically couple are conditionally executed based on the determination.

16. The system of claim 9, wherein the instructions cause the one or more processors to:

receive an input instructing connection of two or more selected nodes of the graph with one or more edges;

make a determination that an upstream logical routine represented by an upstream node of the graph is dependent on data output by a downstream logical routine represented by a downstream node of the graph; and in response to the determination, cause an error message to be output.

17. At least one non-transitory computer-readable medium comprising instructions that, in response to execution by one or more processors, cause the one or more processors to:

cause one or more graphical user interfaces (GUIs) to be rendered on one or more displays, wherein each GUI of the one or more GUIs includes a working canvas on which a plurality of nodes corresponding to at least some of a plurality of available logical routines are manipulable to form a graph defining a machine learning state machine, wherein edges of the graph represent logical couplings between the logical routines of the plurality of available logical routines that are represented by the nodes of the graph;

identify first and second partially redundant nodes in the graph, the first and second partially redundant nodes having at least one overlapping logical operation, the first partially redundant node having a first non-overlapping logical operation, the second partially redundant node having a second non-overlapping logical operation, wherein the at least one overlapping logical operation represents execution of one or more machine learning models;

merge the at least one overlapping logical operation of the first and second partially redundant nodes into a consolidated logical routine;

logically couple the first non-overlapping logical operation with the consolidated logical routine; and logically couple the second non-overlapping logical operation with the consolidated logical routine.

18. The at least one non-transitory computer-readable medium of claim 17, wherein the instructions to logically couple are executed during compilation of source code that is generated based on a state of the graph on the working canvas.

19. The at least one non-transitory computer-readable medium of claim 17, wherein the instructions to logically couple cause the one or more processors to generate glue code that is to provide output from the consolidated logical routine to the first non-overlapping logical operation.

20. The at least one non-transitory computer-readable medium of claim 17, wherein the instructions cause the one or more processors to add a new graphical element that corresponds to the consolidated logical routine to the working canvas in response to the merging.

* * * * *